(12) United States Patent
Burnley et al.

(10) Patent No.: US 11,838,563 B2
(45) Date of Patent: *Dec. 5, 2023

(54) SWITCHING BETWEEN TRANSMITTING A PREAUTHORED VIDEO FRAME AND A COMPOSITED VIDEO FRAME

(71) Applicant: Synamedia Limited, Staines Upon Thames (GB)

(72) Inventors: Thomas Paul Burnley, Hampshire (GB); Einav Rivni, Beit-Shemesh (IL); Uziel Joseph Harband, Jerusalem (IL); Zorach Reuven Wachtfogel, Elazar (IL)

(73) Assignee: Synamedia Limited, Staines Upon (GB)

( * ) Notice: Subject to any disclaimer, the term of this patent is extended or adjusted under 35 U.S.C. 154(b) by 204 days.

This patent is subject to a terminal disclaimer.

(21) Appl. No.: 17/231,820

(22) Filed: Apr. 15, 2021

(65) Prior Publication Data

US 2022/0337891 A1  Oct. 20, 2022

(51) Int. Cl.
*H04N 21/239* (2011.01)
*H04N 21/234* (2011.01)
*H04N 21/2668* (2011.01)

(52) U.S. Cl.
CPC ... *H04N 21/23424* (2013.01); *H04N 21/2393* (2013.01); *H04N 21/2668* (2013.01)

(58) Field of Classification Search
CPC .......................... H02N 21/60; H04N 21/20–80
See application file for complete search history.

(56) References Cited

U.S. PATENT DOCUMENTS

| 6,889,327 B1* | 5/2005 | Inoha | G11B 20/00086 |
| | | | 348/E7.063 |
| 2008/0155586 A1* | 6/2008 | Yang | H04N 21/234363 |
| | | | 725/32 |

(Continued)

FOREIGN PATENT DOCUMENTS

EP    2088751 B1    7/2013

OTHER PUBLICATIONS

PCT International Search Report and Written Opinion dated Sep. 15, 2022, PCT International Application No. PCT/GB2022/051411, pp. 1-15.

(Continued)

*Primary Examiner* — Mushfikh I Alam
(74) *Attorney, Agent, or Firm* — Fernando & Partners, LLP

(57) ABSTRACT

A method includes transmitting a first preauthored video frame of a plurality of preauthored video frames to a client device. The first preauthored video frame is associated with a preauthored media object. The method includes providing a request for a composited video frame to an interactive source device. The request includes a temporal characteristic associated with the first preauthored video frame. The method includes, in response to providing the request, obtaining, from the interactive source device, the composited video frame including customizable video content and preauthored video content. The preauthored video content is associated with a portion of the preauthored media object based on the temporal characteristic. The method includes, in response to detecting that the first preauthored video frame and the composited video frame together satisfy a switching condition, transmitting the composited video frame to the client device after transmitting the first preauthored video frame to the client device.

20 Claims, 5 Drawing Sheets

(56) References Cited

U.S. PATENT DOCUMENTS

| | | | |
|---|---|---|---|
| 2014/0282730 A1* | 9/2014 | Hieb | H04N 21/482 |
| | | | 725/43 |
| 2016/0323608 A1 | 11/2016 | Bloch et al. | |
| 2016/0334973 A1* | 11/2016 | Reckhow | H04N 21/4312 |
| 2016/0366202 A1 | 12/2016 | Phillips et al. | |
| 2017/0070786 A1* | 3/2017 | Keene | G06F 3/0484 |
| 2017/0111418 A1 | 4/2017 | Warren et al. | |
| 2018/0063202 A1* | 3/2018 | Dhanabalan | H04N 21/2343 |
| 2018/0160176 A1 | 6/2018 | Millar | |
| 2020/0007901 A1 | 1/2020 | Hoeben | |
| 2020/0335133 A1* | 10/2020 | Vaucher | G06F 3/0482 |
| 2021/0358456 A1* | 11/2021 | Krishnan | G09G 5/37 |
| 2022/0021947 A1* | 1/2022 | Ohno | A63F 13/795 |

OTHER PUBLICATIONS

Alexandra Mikityuk et al., "Paradigm shift in IPTV service generation: Comparison between locally-and Cloud-rendered IPTV UI." 2014 IEEE 11th Consumer Communications and Networking Conference (CCNC). IEEE, 2014. (Abstact of article provided).

* cited by examiner

SWITCHING BETWEEN TRANSMITTING A PREAUTHORED VIDEO FRAME AND A COMPOSITED VIDEO FRAME

TECHNICAL FIELD

The present disclosure relates to content delivery, and in particular, switching between transmitting different content types to a client device.

BACKGROUND

In some circumstances, a content delivery deployment includes a plurality of source devices that collectively deliver different respective content types to a client device. For example, a first source device delivers media objects, such as a movie, a television show, a commercial, etc. As another example, a second source device delivers user interface (UI) content, which enables the client device to interface with one or more media objects. However, current content delivery deployments do not include a mechanism for efficiently switching between delivering different content types to a client device.

BRIEF DESCRIPTION OF THE DRAWINGS

So that the present disclosure can be understood by those of ordinary skill in the art, a more detailed description may be had by reference to aspects of some illustrative embodiments, some of which are shown in the accompanying drawings.

Figure 1:
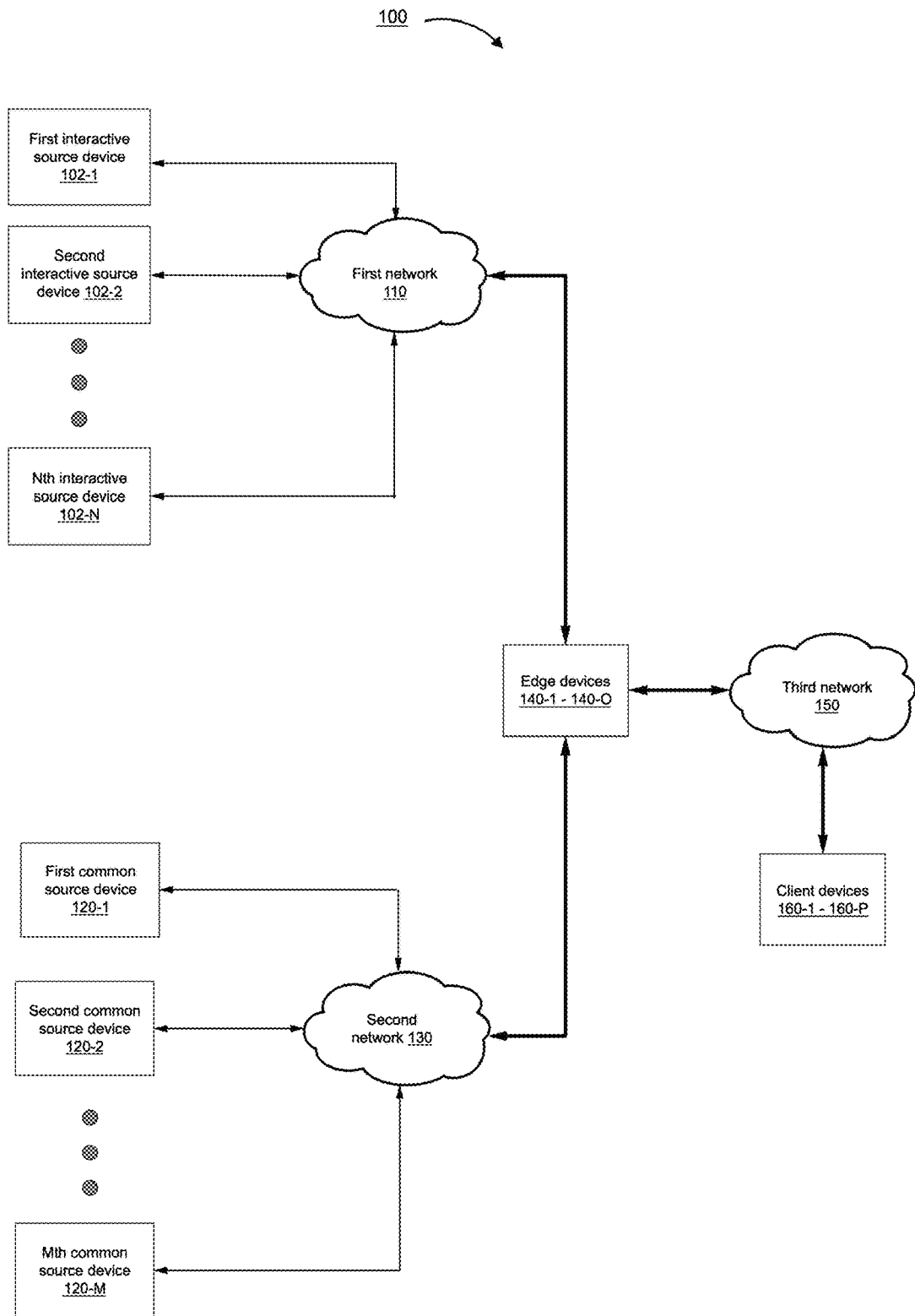
FIG. 1 is a block diagram of an example of a first content delivery environment in accordance with some embodiments.

In accordance with common practice, various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Numerous details are described in order to provide a thorough understanding of the example embodiments shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example embodiments described herein.

Overview

Techniques for efficient switching between transmitting different content types to a client device are disclosed herein. To that end, in some embodiments, a network device communicates with a plurality of source devices providing respective content types, and the network device switches transmission of the different content types to the client device based on detecting satisfaction of a switching condition. For example, in response to receiving a request for user interface (UI) content from a client device, the network device switches from transmitting, to the client device, preauthored video frames (e.g., video frames of adaptive bitrate (ABR) segments) to transmitting a composited video frame to the client device. In order to facilitate the switching, the network device provides, to an interactive source device, a request for the UI content. The request includes timing information associated with content current playing at the client device (e.g., a currently playing preauthored video frame). After receiving the composited video frame, which includes the UI content and preauthored video content, the network device relays (e.g., transmits without processing) the composited video frame to the client device. Accordingly, switching between transmission of different content types is more seamless, as compared with other content delivery deployments. The client device, therefore, experiences a more seamless transition between reception of different content types, resulting in an enhanced quality of experience.

In accordance with some embodiments, a method is performed at a network device including a plurality of network interfaces. For example, the network device corresponds to an edge device that is in the cloud or near the cloud, near one or more of the source devices. The method includes transmitting, to a client device via a particular one of the plurality of network interfaces, a first preauthored video frame of a plurality of preauthored video frames. The first preauthored video frame is associated with a preauthored media object. The method includes providing, to an interactive source device via a particular one of the plurality of network interfaces, a request for a composited video frame. The request includes a temporal characteristic associated with the first preauthored video frame. The method includes, in response to providing the request, obtaining, from the interactive source device, the composited video frame including customizable video content and preauthored video content. The preauthored video content is associated with a portion of the preauthored media object based on the temporal characteristic. The method includes, in response to detecting that the first preauthored video frame and the composited video frame together satisfy a switching condition, transmitting the composited video frame to the client device after transmitting the first preauthored video frame to the client device.

In accordance with some embodiments, a network device includes one or more processors, a non-transitory memory, and a plurality of network interfaces. The one or more programs are stored in the non-transitory memory and configured to be executed by the one or more processors and the one or more programs include instructions for performing or causing performance of the operations of any of the methods described herein. In accordance with some embodiments, a non-transitory computer readable storage medium has stored therein instructions which when executed by one or more processors of a network device, cause the network device to perform or cause performance of the operations of any of the methods described herein. In accordance with some embodiments, a network device includes means for performing or causing performance of the operations of any of the methods described herein. In accordance with some embodiments, an information processing apparatus, for use in a network device, includes means for performing or causing performance of the operations of any of the methods described herein.

Content delivery deployments may include a plurality of source devices that collectively deliver different respective content types to a client device. For example, a first source device delivers media objects, such as a movie, a television show, a commercial, etc. A particular media object may include adaptive bitrate (ABR) video segments, corresponding to different representations (e.g., different video resolutions provided at different encoding rates) of the same underlying media content. The first source device may provide the media object to the client device in association with a streaming video service, such as video on demand (VOD) content or over the top (OTT) content. As another example, a second source device delivers user interface (UI) content, which enables the client device to interface with one or more media objects. For instance, a UI playback menu provides playback controls with respect to a currently playing media object, whereas a UI home screen includes respective previews (e.g., thumbnails) of different media objects. However, current content delivery deployments do not include a mechanism for efficiently switching between delivering different content types to a client device. For example, while a client device is playing ABR content from an ABR source device, the client device sends a keypress request for UI content to a UI source device. Accordingly, the client device receives the UI content from the UI source device. Subsequently, the client device waits for an ABR reference frame (e.g., an intraframe) from the ABR source device, and composites the UI content with the reference frame. This waiting results in a delay between the client device sending the keypress request and the client device displaying the composited frame (UI content plus ABR reference frame), resulting in a degraded user experience.

By contrast, various embodiments described below provide more efficient switching between transmission of different content types to a client device.

Example Embodiments

FIG. 1 is a block diagram of an example of a first content delivery environment 100 in accordance with some embodiments. Briefly, the first content delivery environment 100 includes one or more edge devices 140-1-140-O that deliver various content types from a plurality of source devices to one or more client devices 160-1-160-P via a third network 150. To that end, each of the edge device(s) 140-1-140-O includes a plurality of network interfaces that enable communication with a plurality of source devices and communication with one or more client devices. The plurality of network interfaces may be associated with personal area networks (PANs), wired local area networks (LANs), wireless local area networks (WLANs), wireless wide area networks (WWANs), and so forth. The plurality of network interfaces can utilize acoustic, radio frequency, optical, or other signals to exchange data between the plurality of source devices and the client device(s) 160-1-160-P. The plurality of source devices incudes one or more interactive source devices 102-1-102-N and one or more common source devices 120-1-120-M. The interactive source device(s) 102-1-102-N provide respective content to the edge device(s) 140-1-140-O via a first network 110, and the common source device(s) 120-1-120-M provide respective content to the edge device(s) 140-1-140-O via a second network 130.

A particular interactive source device provides, to an edge device, customizable content, such as a user interface (UI) element (e.g., poster or a banner). The edge device ultimately delivers the UI element to a client device that requested the UI element. For example, based on receiving a keypress input from a client device requesting a home screen (e.g., a series of thumbnails that provide previews of different movie/TV titles), an edge device relays the request to an interactive source device. Continuing with this example, the edge device delivers the home screen content from the interactive source device to the client device in order to satisfy the request. According to various embodiments, an interactive source device can modify customizable content, and provide the modified customizable content to an edge device. For example, the interactive source device can composite UI content with preauthored video content, and provide, to the edge device, a composited video frame including the UI content and preauthored video content. As one example, the interactive source device generates an intraframe (I-Frame), and overlays UI content onto the I-Frame. Continuing with this example, after generating the I-Frame, the interactive source device renders additional UI video frames including UI content. The additional UI video frames may or may not include an I-Frame.

A particular common source device provides, to an edge device, preauthored media content, such as a plurality of preauthored video frames. The preauthored media content can include any multimedia data, such as video data, audio data, etc. For example, the preauthored media content includes a plurality of ABR video segments. In some embodiments, the common source device(s) 120-1-120-M collectively correspond to a network of distributed content delivery systems, such as a content delivery network (CDN).

Each of the first network 110, the second network 130, and the third network 150 may correspond to one of a variety of different types of networks. For example, one of the networks may correspond to one of a Wi-Fi network, a Wi-Fi Direct network, BLUETOOTH, a radio network, a cellular network (e.g., third generation, fourth generation (e.g., LTE), and/or fifth generation (5G)), a satellite network, a cable network, a landline-based network, the Internet, intranets, a telephone network, a television network, data networks, or other communication mediums connecting multiple computing devices to one another, as non-limiting examples.

The edge device(s) 140-1-140-O collectively deliver various content types from the plurality of source devices to the one or more client devices 160-1-160-P. In some embodiments, there is a one-to-one relationship between the edge device(s) 140-1-140-O and the client device(s) 160-1-160-P. For example, a first edge device delivers content to a first client device, a second edge device delivers content to a second client device, etc. In some embodiments, a particular edge device delivers content to a plurality of client devices, such as when the plurality of client devices share common characteristics (e.g., similar geography, similar viewing patterns, etc.). Examples of the client device(s) 160-1-160-P includes user equipment (UE) directly usable by an end user, such as a laptop, smartphone, tablet, etc.

Figure 2:
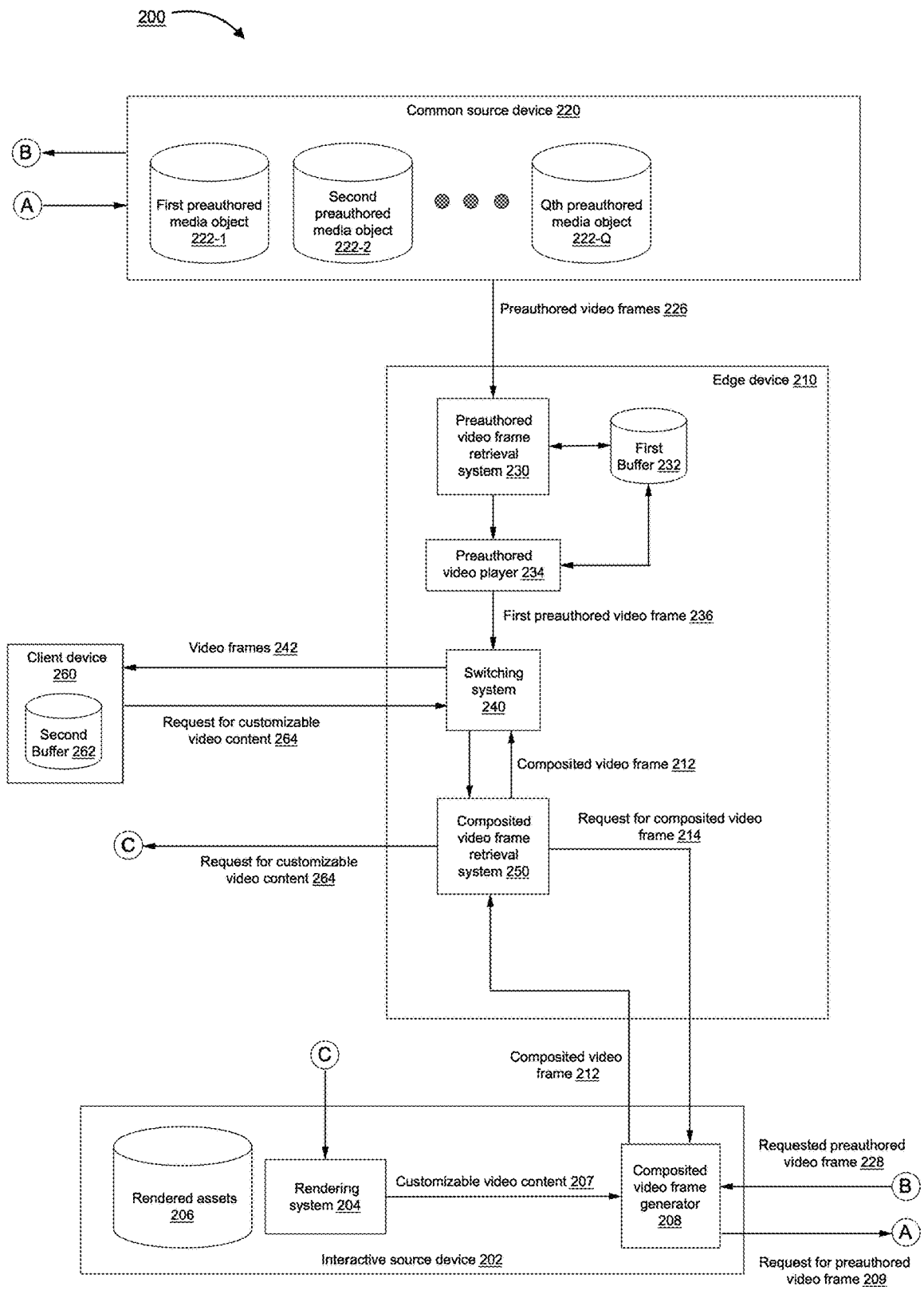
FIG. 2 is a block diagram of an example of a second content delivery environment for switching between transmitting a preauthored video frame and a composited video frame in accordance with some embodiments.

FIG. 2 is a block diagram of an example of a second content delivery environment 200 for switching between transmitting a preauthored video frame and a composited video frame in accordance with some embodiments. The second content delivery environment 200 includes an interactive source device 202, a common source device 220, an edge device 210, and a client device 260. In some embodiments, portions of the second content delivery environment 200 are similar to and adapted from corresponding portions of the first content delivery environment 100. Illustration of networks are omitted for the sake of clarity. The edge device 210 is not collocated with the interactive source device 202, the common source device 220, or with the client device 260. Accordingly, the edge device 210 includes a plurality of network interfaces (not illustrated for the sake of clarity) to facilitate communication with the interactive source device 202, the common source device 220, and the client device 260. For example, the edge device 210 includes a first network interface for communication with the interactive source device 202, a second network interface for communication with the common source device 220, and a third network interface for communication with the client device 260.

The edge device 210 includes a preauthored video frame retrieval system 230 that retrieves a plurality of preauthored video frames 226 from the common source device 220. The plurality of preauthored video frames 226 is associated with a particular preauthored media object, such as a complete television show or a complete movie. To that end, in some embodiments, the common source device 220 includes one or more preauthored media object datastores 222-1-222-Q. Each of the preauthored media object datastore(s) 222-1-222-Q may store video frames associated with a distinct preauthored media object. For example, the first preauthored media object datastore 222-1 stores video frames associated with a first movie, the second preauthored media object datastore 222-2 stores video frames associated with a first TV show, the third preauthored media object datastore 222-3 stores video frames associated with a second movie, etc. In turn, the preauthored video frame retrieval system 230 provides the plurality of preauthored video frames 226 to a preauthored video player 234 of the edge device 210. In some embodiments, the preauthored video frame retrieval system 230 stores at least a portion of the plurality of preauthored video frames 226 in a first buffer 232 of the edge device 210.

The preauthored video player 234 selects a first preauthored video frame 236 of the plurality of preauthored video frames 226. For example, the first preauthored video frame 236 is based on a playback request from the client device 260, such as a request to start a movie or resume playback of a paused television show. As another example, during playback of media content at the client device 260, the first preauthored video frame 236 is the next preauthored video frame for playout relative to the currently playing preauthored video frame at the client device 260. The preauthored video player 234 provides the first preauthored video frame 236 to a switching system 240, which may or may not forward the first preauthored video frame 236 (as part of the video frames 242) to the client device 260, based on a switching condition. The switching condition will be described below. In some embodiments, the preauthored video player 234 retrieves certain preauthored video frames from the first buffer 232 to enable smoother eventual delivery to the client device 260. Correspondingly, the client device 260 may include a second buffer 262 to buffer incoming video frames. In some adaptive bitrate (ABR) embodiment, the preauthored video player 234 encodes the first preauthored video frame 236 in order to generate a corresponding plurality of video representations associated with different resolutions (e.g., 720p, 1080p, 4K). For example, based on bandwidth currently available to the client device 260 and/or the current fill level of the second buffer 262, the preauthored video player 234 selects a suitable one of the video representations, and provides the selected video representation to the switching system 240.

The switching system 240 transmits a sequence of video frames 242 to the client device 260 via a network interface. At a given point in time, the video frames 242 may correspond to one of the first preauthored video frame 226 or a composited video frame 212, based on a switching condition. For example, during ABR playback, the switching system 240 provides preauthored video frames from the preauthored video player 234 to the client device 260, such as a stream of ABR segments.

On the other hand, in response to detecting satisfaction of a switching condition associated with the first preauthored video frame 236, the switching system 240 transmits the composited video frame 212 to the client device 260. For example, while the switching system 240 is transmitting (or preparing to transmit) the first preauthored video frame 236 to the client device 260, the switching system 240 receives a request for customizable video content 264 (e.g., a request to pause playback) from the client device 260. Accordingly, the switching system 240 foregoes transmitting a second one of the plurality of preauthored video frames 226, and directs a composited video frame retrieval system 250 to obtain the composited video frame 212. Consequently, the composited video frame retrieval system 250 provides a request for the composited video frame 214 to a composited video frame generator 208 of the interactive source device 202. The request for the composited video frame 214 includes a temporal characteristic associated with the first preauthored video frame 236. For example, the temporal characteristic corresponds to a temporal position of the first preauthored video frame 226 with respect to the preauthored media object. As another example, the temporal characteristic corresponds to a timestamp associated with the first preauthored video frame 226. Accordingly, the temporal characteristic indicates timing information regarding current playback at the client device 260. The temporal characteristic enables the composited video frame generator 208 to retrieve an appropriate preauthored video frame from the common source device 220. For example, the retrieved preauthored video frame is temporally associated with (e.g., sequentially related to) a preauthored video frame currently playing at the client device 260. To that end, the composited video frame generator 208 sends a request for a preauthored video frame 209 (including the temporal characteristic) to the common source device 220, and receives back a requested preauthored video frame 228.

The composited video frame generator 208 generates the composited video frame 212 based on the requested preauthored video frame 228 and the request for customizable video content 264. To that end, the interactive source device 202 includes a rendering system 204 for rendering customizable video content 207, based on the request for customizable video content 264. For example, when the request for customizable video content 264 corresponds to pause playback request, the rendering system 204 renders a playback control user interface that includes a pause button, resume play button, fast forward button, and rewind button. In some embodiments, the interactive source device 202 includes a rendered assets datastore 206 for storing certain rendered customizable assets, such as customizable content that is frequently requested by the client device 260 or otherwise predicted to be requested by the client device 260. The composited video frame generator 208 composites the customizable video content 207 with the requested preauthored video frame 228 in order to generate the composited video frame 212, and provides the composited video frame 212 to the composited video frame retrieval system 250. In turn, the composited video frame retrieval system 250 provides the composited video frame 212 to the switching system 240. In response to detecting satisfaction of the switching condition, the switching system 240 transmits the composited video frame 212 to the client device 260 after transmitting the first preauthored video frame 236 to the client device 260.

Figure 3:
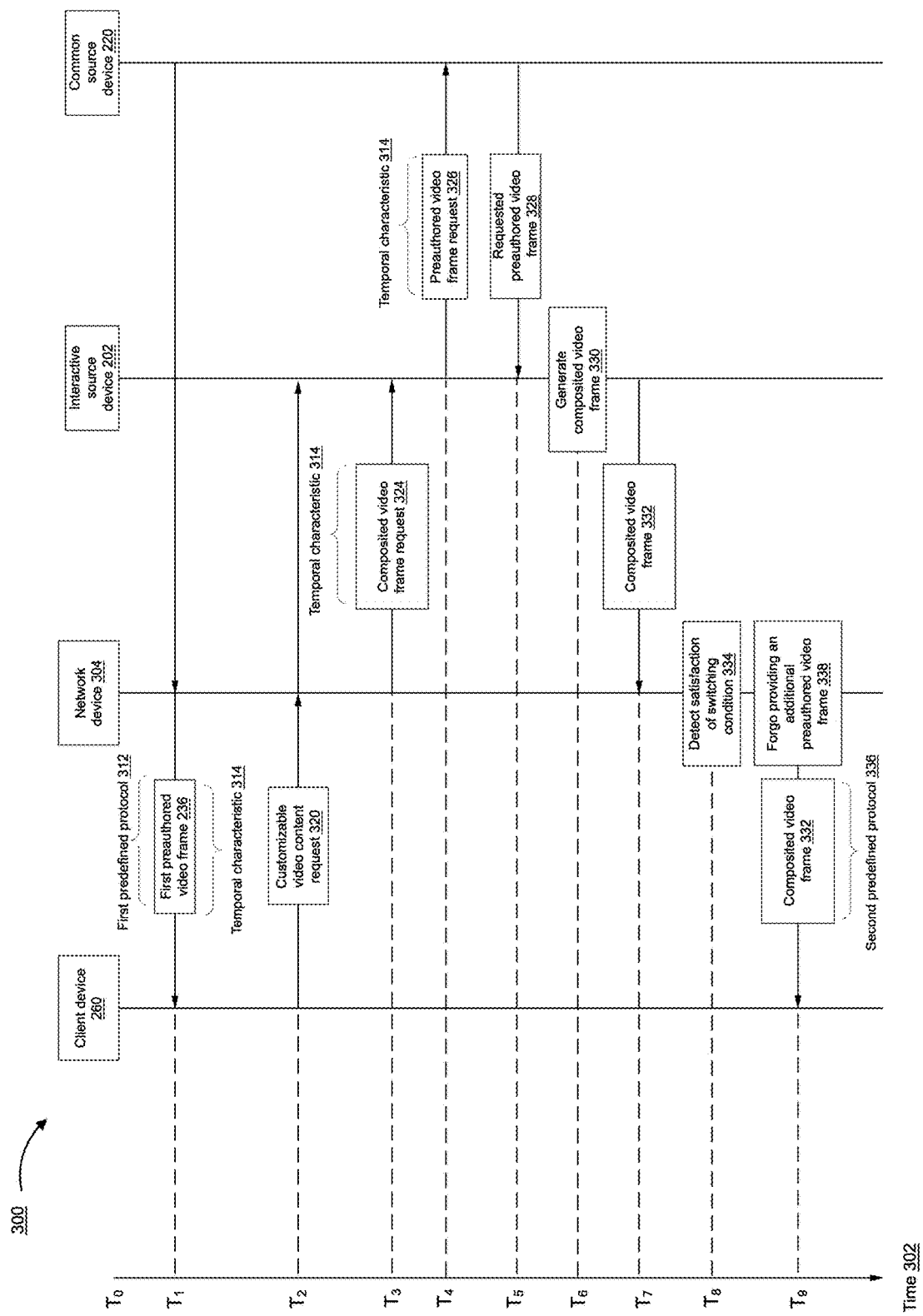
FIG. 3 is an example of a timeline representation of a method of switching between transmitting a preauthored video frame and a composited video frame in accordance with some embodiments.

FIG. 3 is an example of a timeline representation 300 of a method of switching between transmitting a preauthored video frame and a composited video frame in accordance with some embodiments. According to various embodiments, the technique illustrated by the timeline representation 300 is performed in part by a network device 304. For example, the network device 304 corresponds to an edge device, such as the edge device 210 illustrated in FIG. 2. As illustrated in FIG. 3, a current time indicator 302 indicates the passage of time, starting at an initial time $T_0$.

At a first time $T_1$, the network device 304 transmits a first preauthored video frame 236 of a plurality of preauthored video frames from the common source device 220 to the client device 260. The first preauthored video frame 236 is associated with a preauthored media object. For example, a selected movie is streaming at the client device 260 at time $T_1$, and the first preauthored video frame 236 is currently being transmitted or being prepared for transmission to the client device 260. In some embodiments, the network device 304 transmits the first preauthored video frame 236 according to a first predefined protocol 312 (e.g., at a playout rate). For example, the first predefined protocol 312 corresponds to a predefined video streaming protocol that supports ABR, such as Dynamic Adaptive Streaming over HTTP (MPEG-DASH), Microsoft Smooth Streaming (MSS), HTTP Dynamic Streaming (HDS), HTTP Live Streaming (HLS), etc. The first preauthored video frame 236 is associated with a temporal characteristic 314, such as a timestamp associated with the first preauthored video frame 236 or a relative temporal position of the first preauthored video frame 236 within the preauthored media object (e.g., halfway point of playback of the movie).

At a second time $T_2$, in some embodiments, the network device 304 receives a customizable video content request 320 from the client device 260. For example, the customizable video content request 320 corresponds to the request for customizable video content 264 illustrated in FIG. 2. As one example, the customizable video content request 320 is associated with a pause playback keypress input received at the client device 260.

At a third time $T_3$, based on receiving the customizable video content request 320, the network device 304 provides, to the interactive source device 202, a composited video frame request 324. The composited video frame request 324 includes the temporal characteristic 314. For example, with reference to FIG. 2, the composited video frame request 324 corresponds to the request for composited video frame 214. Providing the temporal characteristic 314 to the interactive source device 202 enables the interactive source device 202 to retrieve a temporally aligned—e.g., with what is being transmitted to the client device 260) preauthored video frame from the common source device 220.

At a fourth time $T_4$, in some embodiments, based on receiving the composited video frame request 324, the interactive source device 202 provides a preauthored video frame request 326 to the common source device 220. The preauthored video frame request 326 includes the temporal characteristic 314. In turn, at a fifth time $T_5$, in some embodiments, the common source device 220 provides a requested preauthored video frame 328 to the interactive source device 202. For example, with reference to FIG. 2, the requested preauthored video frame 328 corresponds to the requested preauthored video frame 228. As another example, the common source device 220 provides a sequence of preauthored video frames (including the requested preauthored video frame 328) that are temporally aligned based on the temporal characteristic 314, such as content that the client device 260 is currently streaming from the common source device 220.

At a sixth time $T_6$, in some embodiments, based on the requested preauthored video frame 328 and the customizable video content request 320 (received at time $T_2$), the interactive source device 202 generates a composited video frame 332, as represented by block 330. For example, the composited video frame 332 includes customizable video content (e.g., a pause playback menu) that is based on the customizable video content request 320 (e.g., pause playback keypress). Continuing with this example, the interactive source device 202 overlays the customizable video content onto the requested preauthored video frame 328 in order to generate the composited video frame 332. According to various embodiments, the composited video frame 332 corresponds to an I-Frame. At a seventh time $T_7$, the interactive source device 202 provides the composited video frame 332 to the network device 304.

At an eighth time $T_8$, the network device 304 detects that the first preauthored video frame 236 and the composited video frame 332 together satisfy a switching condition, as represented by block 334. In some embodiments, the network device 304 detects satisfaction of the switching condition when the first preauthored video frame 236 and the composited video frame 332 together satisfy a temporal criterion with respect to each other. For example, the network device 304 detects satisfaction of the switching condition when a first temporal value (associated with the first preauthored video frame 236) and a second temporal value (associated with the composited video frame 332) match each other within an error threshold. Using temporal alignment as a basis for the switching between transmission of preauthored video content and UI content reduces viewable consequences associated with the switch.

At a ninth time $T_9$, based on detecting satisfaction of the switching condition, the network device 304 transmits the composited video frame 332 to the client device 260. For example, the network device 304 forwards the composited video frame 332 without processing the composited video frame 332, resulting in a relatively low latency communication. In some embodiments, the network device 304 transmits the composited video frame 332 according to a second predefined protocol 336 that is different from the first predefined protocol 312. For example, the second predefined protocol 336 corresponds to a low-latency peer-to-peer protocol (e.g., Real-time Transport Protocol (RTP) or and/or RTP Control Protocol (RTCP). For example, the network device 304 transmits the composited video frame 332 to the client device 260 via a Web Real-Time Communication (WebRTC) channel. Moreover, as represented block 338, in some embodiments, the network device 304 (e.g., temporarily) foregoes transmitting, to the client device 260, an additional preauthored video frame of the plurality of preauthored video frames. In some embodiments, after transmitting the composited video frame 332 to the client device 260, the network device 304 transmits additional UI content (from the interactive source device 202) to the client device 260, wherein the additional UI content may or may not include an I-frame.

Figure 4:
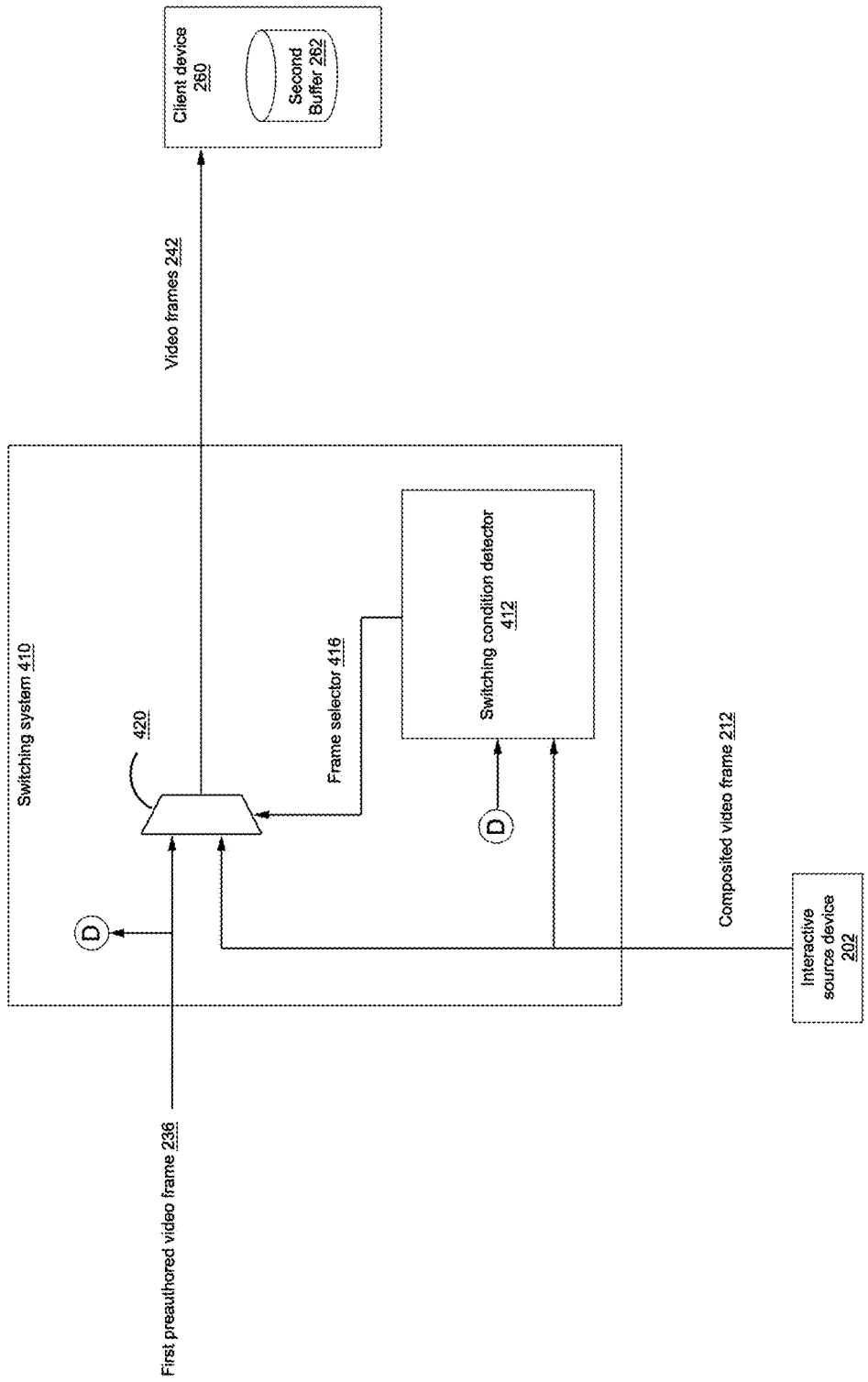
FIG. 4 is a block diagram of an example of a switching system in accordance with some embodiments.

FIG. 4 is a block diagram of an example of a switching system 410 in accordance with some embodiments. In some embodiments, the switching system 410 is similar to and adapted from the switching system 240 illustrated in FIG. 2.

The switching system 410 facilities between transmitting the first preauthored video frame 236 and transmitting the composited video frame 212, based on a switching condition. To that end, the switching system 410 includes a switching condition detector 412 and a content selector multiplexer 420. The content selector multiplexer 420 transmits the video frames 242 to the client device 260. In particular, at a given time the content selector multiplexer 420 transmits one of the first preauthored video frame 236 or the composited video frame 212, based on a frame selector 416 from the switching condition detector 412. For example, when the frame selector 416 has a value of '0,' the content selector multiplexer 420 transmits the first preauthored video frame 236. On the other hand, when the frame selector 416 has a value of '1,' the content selector multiplexer 420 transmits the composited video frame 212.

The switching condition detector 412 detects that the first preauthored video frame 236 and the composited video frame 212 together satisfy a switching condition. According to various embodiments, as described with reference to block 334 of FIG. 3, the switching condition is a function of temporal alignment between the first preauthored video frame 236 and the composited video frame 212. For example, in response to determining that the first preauthored video frame 236 and the composited video frame 212 are temporally aligned with respect to each other, the switching condition detector 412 changes the frame selector 416 value from '0' to '1' because, at that point in time, the composited video frame 212 is temporally aligned with a video frame that the client device 260 is currently receiving.

Figure 5:
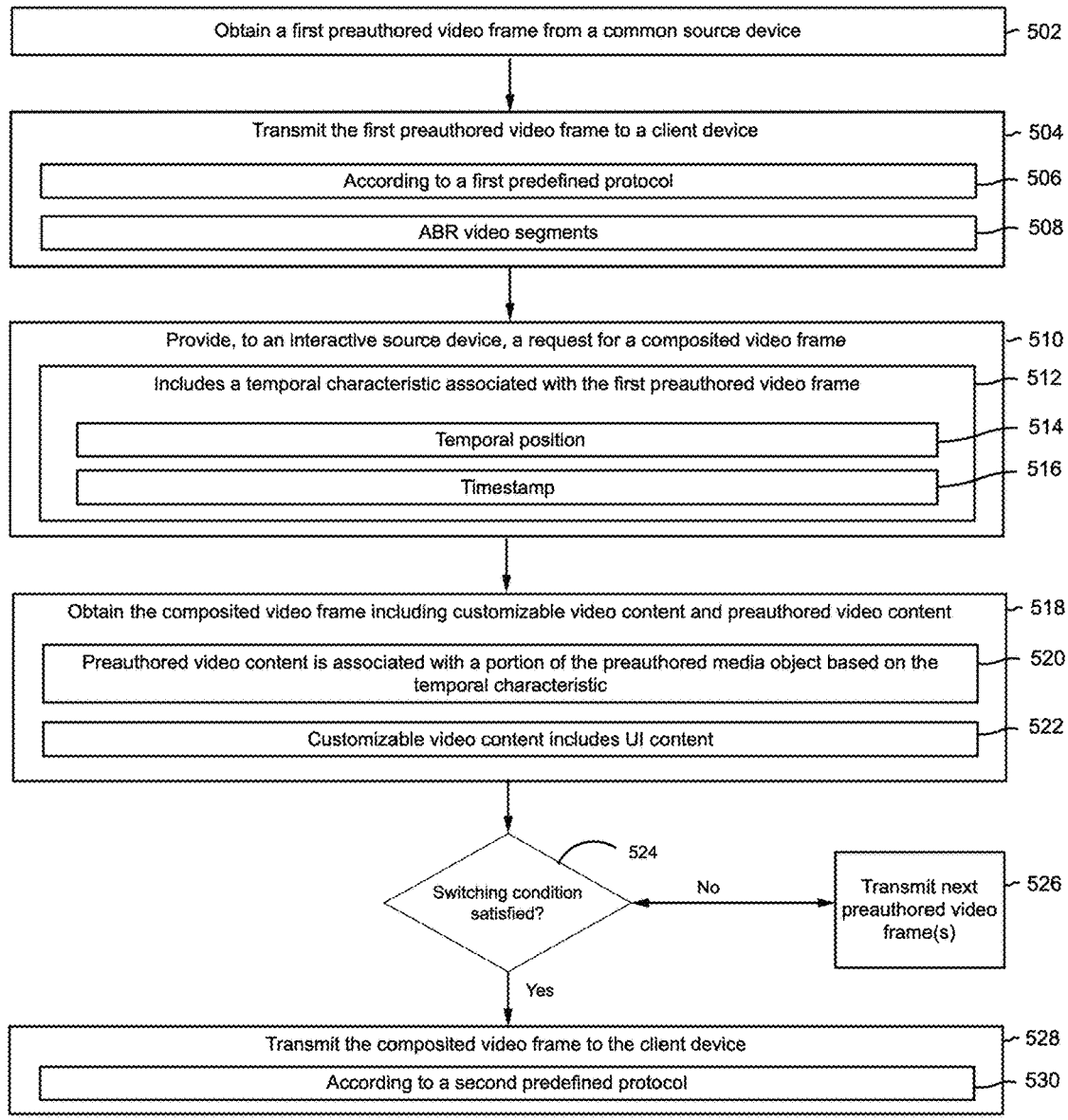
FIG. 5 is an example of a flow diagram of a method of switching between transmitting a preauthored video frame and a composited video frame in accordance with some embodiment.

FIG. 5 is an example of a flow diagram of a method 500 of switching between transmitting a preauthored video frame and a composited video frame in accordance with some embodiment. In some embodiments, the method 500 or portions thereof is performed by a network device that includes a plurality of network interfaces, such as at the network device 304 illustrated in FIG. 3. For example, the network device corresponds to an edge device (e.g., the edge device 210 in FIG. 2) that includes a switching system and a non-transitory memory (e.g., a buffer). In some embodiments, the method 500 or portions thereof is performed at a controller that is integrated in a network device. In some embodiments, the method 500 or portions thereof is performed by an apparatus that includes a plurality of network interfaces and various components to perform the operations of the method 500.

As represented by block 502, in some embodiments, the method 500 includes obtaining, from a common source device via a particular one of the plurality of network interfaces, a first preauthored video frame of a plurality of preauthored video frames. The preauthored video frame is associated with a preauthored media object. For example, with reference to FIG. 2, the edge device 210 obtains the first preauthored video frame 226 from the common source device 220. In some embodiments, the method 500 includes retrieving the first preauthored video frame from a local non-transitory memory, such as the first buffer 232 in FIG. 2.

As represented by block 504, the method 500 includes transmitting, to a client device via a particular one of the plurality of network interfaces, the first preauthored video frame. For example, with reference to FIG. 4, while the frame selector 416 has a value of '0' (e.g., in streaming mode), the content selector multiplexer 420 transmits the first preauthored video frame 236 to the client device 260. In some embodiments, as represented by block 506, transmitting the first preauthored video frame is according to a first predefined protocol, such as a video streaming protocol that supports ABR. In some embodiments, as represented by block 508, the plurality of preauthored video frames is associated with ABR video segments. For example, with reference to FIG. 2, the preauthored video player 234 encodes the first preauthored video frame 236 in order to generate a plurality of representations (e.g., 720p, 1080p, 4K) respectively associated with a plurality of encoding bitrates.

As represented by block 510, the method includes providing, to an interactive source device via a particular one of the plurality of network interfaces, a request for a composited video frame. As represented by block 512, the request includes a temporal characteristic associated with the first preauthored video frame. For example, with reference to FIG. 3, the network device 304 provides, to the interactive source device 202, the composited video frame request 324 including the temporal characteristic 314. In some embodiments, as represented by block 514, the temporal characteristic corresponds to a temporal position of the first preauthored video frame with respect to the preauthored media object. For example, the temporal characteristic indicates that the first preauthored video frame is frame number 912 of the 2,333 total preauthored video frames of the preauthored media object. In some embodiments, as represented by block 516, the temporal characteristic corresponds to a timestamp associated with the first preauthored video frame. For example, when the preauthored media object is a live television broadcast airing from 7-8 pm, the temporal characteristic indicates that the first preauthored video frame corresponds to 7:02:10 pm (Hour: Minute: Second).

As represented by block 518, the method includes, in response to providing the request for the composited video frame, obtaining, from the interactive source device, the composited video frame. The composited video frame includes customizable video content and preauthored video content. As represented by block 520, the preauthored video content is associated with a portion of the preauthored media object based on the temporal characteristic. For example, the preauthored video content corresponds to (e.g., graphically represents) the first preauthored video frame. As another example, the preauthored video content corresponds to (e.g., graphically represents) a reference video frame of the preauthored media object. In some embodiments, the reference video frame corresponds to an intraframe (I-frame) of the preauthored media object. Accordingly, in contrast to the common source device, the interactive source device is able to generate an I-frame, and composite the customizable video content with the I-frame. As represented by block 522, in some embodiments, the customizable video content includes user interface (UI) content, such as a pause playback menu including playback control affordances (e.g., resume playback, exit to home screen, fast-forward, rewind).

According to various embodiments, a network device (e.g., an edge device) obtains the composited video frame while the network device transmits a sequence of preauthored video frames to the client device. Accordingly, in some embodiments, after transmitting the first preauthored video frame to the client device, the method 500 includes transmitting additional preauthored video frames (from a common source device) to the client device before receiving the composited video frame from the interactive source device.

As represented by block 524, the method 500 includes determining whether or not the first preauthored video frame and the composited video frame together satisfy a switching condition. In response to detecting that the switching condition is not satisfied ("No" path), the method continues to block 526. On the other hand, in response to detecting that the switching condition is satisfied ("Yes" path), the method continues to block 528.

According to various embodiments, detecting that the first preauthored video frame and the composited video frame together satisfy the switching condition is based on respective timing information. To that end, in some embodiments, the method 500 includes determining that a first temporal value (associated with the first preauthored video frame) satisfies a timing criterion with respect to a second temporal value (associated with the composited video frame). For example, the first temporal value matches the second temporal value within an error threshold.

As represented by block 526, in some embodiments, the method 500 includes transmitting the next preauthored video frame to the client device. For example, the next preauthored video frame is sequentially related to the first preauthored video frame (e.g., the next preauthored video frame after the first preauthored video frame). In some embodiments, method 500 includes reverting back to block 524 to determine whether or not the switching condition is satisfied.

As represented by block 528, the method includes transmitting the composited video frame to the client device after transmitting the first preauthored video frame to the client device. For example, with reference to FIG. 3, at the seventh time $T_7$, the network device 304 receives the composited video frame 332. Continuing with this example, after detecting satisfaction of the switching condition at the eighth time $T_8$, the network device 304 transmits the composited video frame 332 to the client device 260 without processing the composited video frame 332 at the ninth time $T_9$. Immediately transmitting (e.g., without processing) the composited video frame 332 to the client device 260 enables a seamless switch from streaming content to UI content to appear at the client device 260, enhancing the user experience. Moreover, at the ninth time $T_9$, the network device 304 foregoes transmitting an additional preauthored video frame to the client device 260, resulting in a reduction in the utilization of channel resources and processing/memory resources. In some embodiments, the method 500 includes transmitting the composited video frame to the client device less than a threshold amount of time after transmitting the first preauthored video frame to the client device. In some embodiments, As represented by block 530, transmitting the composited video frame to the client device is according to a second predefined protocol that is different from the first predefined protocol. For example, the second protocol is a low latency peer-to-peer protocol (e.g., used in video conferencing applications), such as a combination of RTP, RTCP, and WebRTC.

In some embodiments, in response to detecting that the switching condition is satisfied, the method 500 includes foregoing transmitting additional preauthored video frames, following transmission of the first preauthored video frame. For example, the method 500 includes foregoing transmitting a threshold number of preauthored video frames, or foregoing transmitting preauthored video frames for a threshold amount of time.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be implemented in such program instructions, although some or all of the disclosed functions may alternatively be implemented in application-specific circuitry (e.g., ASICs or FPGAs or GP-GPUs) of the computer system. Where the computer system includes multiple computing devices, these devices may be co-located or not co-located. The results of the disclosed methods and tasks may be persistently stored by transforming physical storage devices, such as solid-state memory chips and/or magnetic disks, into a different state.

The disclosure is not intended to be limited to the embodiments shown herein. Various modifications to the embodiments described in this disclosure may be readily apparent to those skilled in the art, and the generic principles defined herein may be applied to other embodiments without departing from the spirit or scope of this disclosure. The teachings of the invention provided herein can be applied to other methods and systems, and are not limited to the methods and systems described above, and elements and acts of the various embodiments described above can be combined to provide further embodiments. Accordingly, the novel methods and systems described herein may be implemented in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:
1. A method comprising:
   at an edge device including a plurality of network interfaces connectable to servers and client devices:
   transmitting, to a client device via a first network interface of the plurality of network interfaces, a first preauthored video frame of a plurality of preauthored video frames, wherein the first preauthored video frame is associated with a preauthored media object;
while transmitting the first preauthored video frame, providing, to an interactive source device hosting a server via a second network interface of the plurality of network interfaces, a request for a composited video frame, wherein the request includes a temporal characteristic associated with the first preauthored video frame;
obtaining, from the interactive source device, the composited video frame including customizable video content generated by the server for the client device in response to receiving the request and preauthored video content obtained by the server, wherein the preauthored video content is associated with a portion of the preauthored media object based on the temporal characteristic; and
in response to detecting that the first preauthored video frame and the composited video frame together satisfy a switching condition, transmitting the composited video frame to the client device after transmitting the first preauthored video frame to the client device.

2. The method of claim 1, wherein the first preauthored video frame is associated with a first temporal value, wherein the composited video frame is associated with a second temporal value, and wherein detecting that the first preauthored video frame and the composited video frame together satisfy the switching condition includes determining that the first temporal value satisfies a timing criterion with respect to the second temporal value.

3. The method of claim 2, wherein determining that the first temporal value satisfies the timing criterion with respect to the second temporal value includes determining that the first temporal value matches the second temporal value within an error threshold.

4. The method of claim 1, wherein the temporal characteristic corresponds to a temporal position of the first preauthored video frame with respect to the preauthored media object.

5. The method of claim 1, wherein the temporal characteristic corresponds to a timestamp associated with the first preauthored video frame.

6. The method of claim 1, wherein transmitting the composited video frame to the client device occurs less than a threshold amount of time after transmitting the first preauthored video frame to the client device.

7. The method of claim 1, further comprising, in response to detecting that the first preauthored video frame and the composited video frame together satisfy the switching condition, foregoing transmitting an additional one of the plurality of preauthored video frames to the client device.

8. The method of claim 1, wherein the preauthored video content corresponds to a reference video frame of the preauthored media object.

9. The method of claim 8, wherein the reference video frame corresponds to an intraframe (I-frame).

10. The method of claim 1, wherein the plurality of preauthored video frames corresponds to adaptive bitrate (ABR) video segments.

11. The method of claim 1, wherein the customizable video content is user interface (UI) content.

12. The method of claim 1, wherein transmitting the first preauthored video frame is according to a first predefined protocol, and wherein transmitting a composited video frame is according to a second predefined protocol that is different from the first predefined protocol.

13. The method of claim 1, further comprising obtaining the plurality of preauthored video frames from a common source device via a particular one of the plurality of network interfaces.

14. An edge device comprising:
a plurality of network interfaces connectable to servers and client devices;
a preauthored video frame retrieval system to obtain a plurality of preauthored video frames including a first preauthored video frame, wherein the first preauthored video frame is associated with a preauthored media object;
a composited video frame retrieval system to:
while transmitting the first preauthored video frame, provide, to an interactive source device hosting a server via a second network interface of the plurality of network interfaces, a request for a composited video frame, wherein the request includes a temporal characteristic associated with the first preauthored video frame; and
obtain, from the interactive source device, the composited video frame including customizable video content generated by the server for the client device in response to receiving the request and preauthored video content obtained by the server, wherein the preauthored video content is associated with a portion of the preauthored media object based on the temporal characteristic; and
a switching system to:
transmit, via a first network interface of the plurality of network interfaces, the first preauthored video frame to a client device; and
in response to detecting that the first preauthored video frame and the composited video frame together satisfy a switching condition, transmit the composited video frame to the client device after transmitting the first preauthored video frame to the client device.

15. The edge device of claim 14, wherein the first preauthored video frame is associated with a first temporal value, wherein the composited video frame is associated with a second temporal value, and wherein detecting that the first preauthored video frame and the composited video frame together satisfy the switching condition includes determining that the first temporal value satisfies a timing criterion with respect to the second temporal value.

16. The edge device of claim 15, wherein determining that the first temporal value satisfies the timing criterion with respect to the second temporal value includes determining that the first temporal value matches the second temporal value within an error threshold.

17. The edge device of claim 14, wherein the temporal characteristic corresponds to one of a temporal position of the first preauthored video frame with respect to the preauthored media object or a timestamp associated with the first preauthored video frame.

18. The edge device of claim 14, wherein the preauthored video content corresponds to a reference video frame of the preauthored media object.

19. The edge device of claim 14, wherein transmitting the first preauthored video frame is according to a first predefined protocol, and wherein transmitting a composited video frame is according to a second predefined protocol that is different from the first predefined protocol.

20. A non-transitory computer-readable medium including instructions, which, when executed by an edge device including one or more processors and a plurality of network interfaces connectable to servers and client devices, cause the edge device to:

transmit, to a client device via a first network interface of the plurality of network interfaces, a first preauthored video frame of a plurality of preauthored video frames, wherein the first preauthored video frame is associated with a preauthored media object;

while transmitting the first preauthored video frame, provide, to an interactive source device hosting a server via a second network interface of the plurality of network interfaces, a request for a composited video frame, wherein the request includes a temporal characteristic associated with the first preauthored video frame;

obtain, from the interactive source device, the composited video frame including customizable video content generated by the server for the client device in response to receiving the request and preauthored video content, wherein the preauthored video content is associated with a portion of the preauthored media object based on the temporal characteristic; and in response to detecting that the first preauthored video frame and the composited video frame together satisfy a switching condition, transmit the composited video frame to the client device after transmitting the first preauthored video frame to the client device.

\* \* \* \* \*